United States Patent [19]
DeBerry

[11] Patent Number: 5,648,054
[45] Date of Patent: Jul. 15, 1997

[54] DOUBLE LOOP LIQUID-LIQUID $H_2S$ REMOVAL PROCESS

[75] Inventor: David W. DeBerry, Austin, Tex.

[73] Assignee: Gas Research Institute, Chicago, Ill.

[21] Appl. No.: 381,111

[22] Filed: Jan. 31, 1995

[51] Int. Cl.[6] ............................................. C01B 17/16
[52] U.S. Cl. ...................... 423/226; 423/228; 423/232; 423/576.2; 423/576.6; 423/220
[58] Field of Search ................................ 423/220, 226, 423/228, 232, 576.2, 576.6

[56] References Cited

U.S. PATENT DOCUMENTS

| | | |
|---|---|---|
| 3,068,065 | 12/1962 | Hartley et al. . |
| 4,009,251 | 2/1977 | Meuly . |
| 4,091,073 | 5/1978 | Winkler . |
| 4,332,781 | 6/1982 | Lieder et al. . |
| 4,348,368 | 9/1982 | Blytas ................................. 423/226 |
| 4,359,450 | 11/1982 | Blytas et al. ........................ 423/226 |
| 4,382,918 | 5/1983 | Diaz ................................ 423/573 R |
| 4,388,293 | 6/1983 | Diaz . |
| 4,390,516 | 6/1983 | Blytas . |
| 4,400,368 | 8/1983 | Diaz . |
| 4,402,930 | 9/1983 | Diaz ................................. 423/573 G |
| 4,409,199 | 10/1983 | Blytas ............................... 423/573 G |
| 4,414,194 | 11/1983 | Blytas ............................... 423/573 G |
| 4,436,711 | 3/1984 | Olson ............................... 423/573 G |
| 4,443,423 | 4/1984 | Olson ............................... 423/573 G |
| 4,443,424 | 4/1984 | Olson ............................... 423/573 G |
| 4,461,754 | 7/1984 | Diaz ................................ 423/573 R |
| 4,518,576 | 5/1985 | Diaz . |
| 4,518,577 | 5/1985 | Klecka ............................. 423/573 R |
| 4,649,032 | 3/1987 | Snavely, Jr. et al. ................ 423/226 |
| 4,781,901 | 11/1988 | Jeffrey ................................. 423/226 |
| 4,816,238 | 3/1989 | Jeffrey ................................. 423/226 |
| 4,832,937 | 5/1989 | Mc Intyre et al. ................. 423/573.1 |
| 5,223,173 | 6/1993 | Jeffrey ................................... 252/191 |

*Primary Examiner*—Deborah Jones
*Assistant Examiner*—Amy M. Harding
*Attorney, Agent, or Firm*—Speckman, Pauley & Fejer

[57] ABSTRACT

A process and system for removal of hydrogen sulfide from a hydrogen sulfide-containing gaseous stream comprising contacting the hydrogen sulfide-containing gaseous stream with a nonaqueous phase sorbent under conditions suitable for forming a hydrogen sulfide-laden sorbent and a clean gaseous stream. The hydrogen sulfide-laden sorbent is mixed with an aqueous phase redox coupled, regenerating the nonaqueous phase sorbent, reducing the aqueous phase redox couple, and forming sulfur. The sulfur is separated from the mixture. The reduced aqueous phase redox couple is extracted from the mixture and regenerated with an oxidizing agent or electrochemical cell.

15 Claims, 1 Drawing Sheet

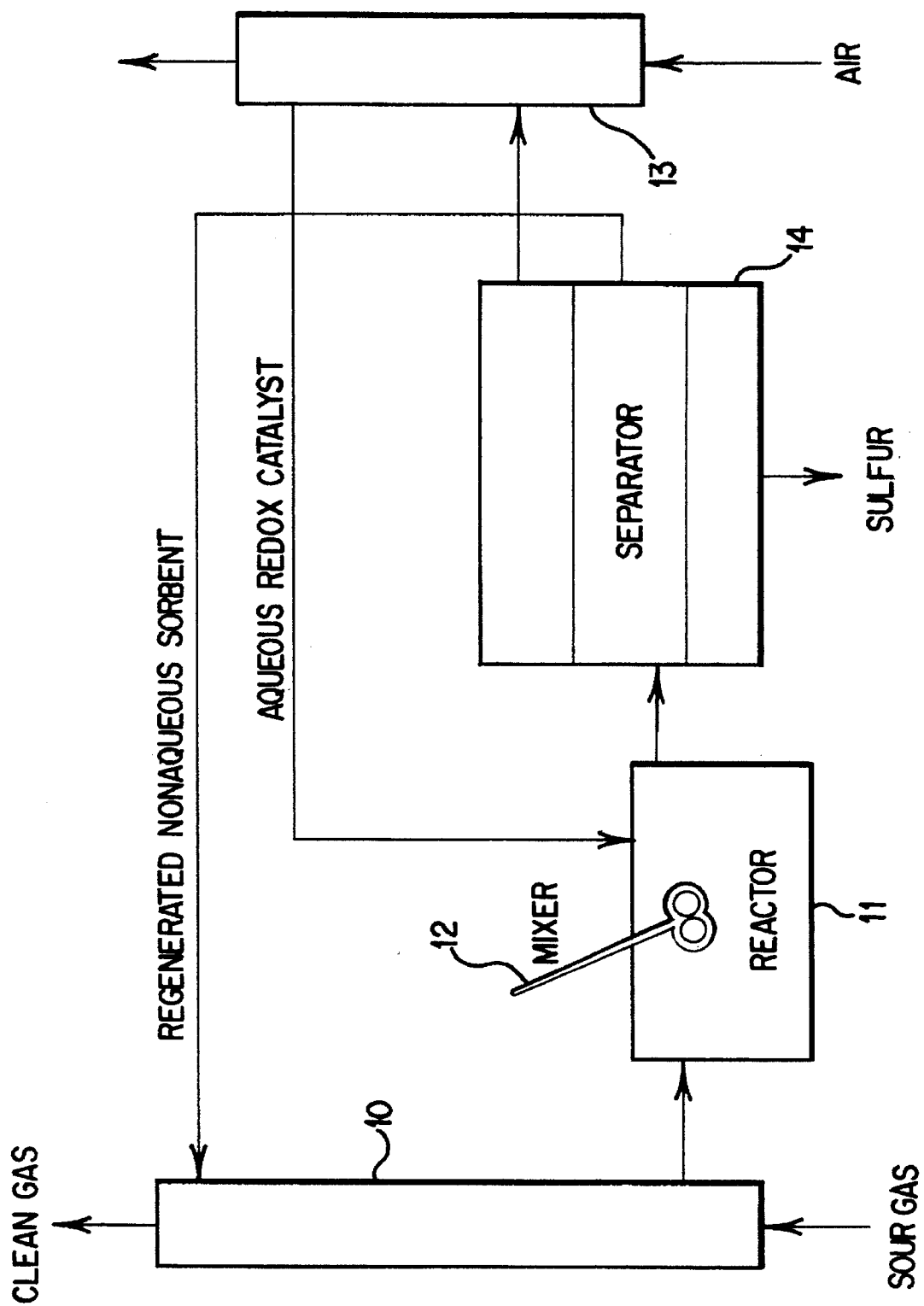

DOUBLE LOOP LIQUID-LIQUID H₂S REMOVAL PROCESS

BACKGROUND OF THE INVENTION

1. Field of the Invention

This invention relates to a process for removal of hydrogen sulfide from a hydrogen sulfide-containing gaseous stream.

2. Description of Prior Art

Conventional liquid redox sulfur recovery processes use a redox couple dissolved in a solvent, normally water, to scrub hydrogen sulfide from a gas stream and convert it to sulfur. The redox agent is reduced by the hydrogen sulfide and regenerated by contacting with air in a separate vessel. For example, U.S. Pat. No. 3,068,065 teaches a process for the removal of hydrogen sulfide from gases in which the gases are washed with an aqueous solution of iron complexed with a polyamino polycarboxylic acid, the iron being in the ferric state for gas washing, and the aqueous solution, after contact with the gas, is regenerated by aeration. U.S. Pat. No. 4,009,251 teaches a process for removing hydrogen sulfide from gaseous streams in which the hydrogen sulfide is oxidized catalytically to sulfur in the presence of an aqueous chelate catalyst solution and a soluble alkaline metal or alkaline earth metal or ammonium or amine salt. U.S. Pat. No. 4,332,781 teaches the removal of hydrogen sulfide and carbonyl sulfide from sour gaseous streams in a staged procedure in which the sour gaseous stream is contacted with an aqueous reactant solution comprising an oxidizing reactant which converts the hydrogen sulfide to sulfur. The reduced aqueous reactants solution is then regenerated for reuse. Similar processes employing aqueous reactant solutions for removal of hydrogen sulfide from sour gas streams are taught by U.S. Pat. No. 4,390,516, U.S. Pat. No. 4,409,199, U.S. Pat. No. 4,359,450, U.S. Pat. No. 4,382,918, U.S. Pat. No. 4,388,293, U.S. Pat. No. 4,400,368, U.S. Pat. No. 4,518,576, and U.S. Pat. No. 4,091,073.

One of the main problems associated with conventional liquid redox sulfur recovery processes is dealing with the solid sulfur which is formed and which can plug the absorber or other vessel through which it passes and which is generally hard to separate and handle when formed from aqueous solutions.

The use of an absorbent to remove hydrogen sulfide from a gas stream containing hydrogen sulfide and carbon dioxide ($CO_2$) and/or carbonyl sulfide (COS) is taught by U.S. Pat. No. 4,091,073; U.S. Pat. No. 4,388,293; U.S. Pat. No. 4,400,368; U.S. Pat. No. 4,382,918; U.S. Pat. No. 4,359,450; U.S. Pat. No. 4,409,199; and U.S. Pat. No. 4,332,781. The '199 patent teaches the use of an aqueous absorbent to absorb the bulk of the $H_2S$. In addition, $H_2S$ absorbed by the aqueous absorbent is merely desorbed in a regeneration system to enable recycle of the aqueous absorbent to the absorber. Similarly, each of the '781 and '450 patents teaches absorption of $H_2S$ followed by desorption and treatment of the desorbed $H_2S$ with an aqueous reactant solution. The '293 patent, the '368 patent, and the '918 patent all teach a process for the removal of hydrogen sulfide and carbon dioxide from a gas stream in which the gas stream is contacted with an aqueous solution of a specific reactant ligand or chelate in a $CO_2$-selective absorbent containing specific stabilizers for improvement of chelate life. The hydrogen sulfide which may also be absorbed is immediately converted to sulfur by the reactant chelate, resulting in reduction of the reactant chelate. Finally, U.S. Pat. No. 4,091,073 teaches the use of an absorbent mixture of organic solvent and aqueous reactant solution for simultaneous removal of hydrogen sulfide and carbon dioxide from a variety of gas streams where the absorbent is used to absorb only $CO_2$. The hydrogen sulfide in the gas stream is converted to sulfur.

In each of the U.S. patents discussed hereinabove in which a mixture of an aqueous reactant solution and an absorbent are employed for removing hydrogen sulfide from a gas stream, reaction of the aqueous reactant solution with the hydrogen sulfide is carried out in the absorber thus creating a likelihood of absorber plugging due to the formation of sulfur therein. In addition, such processes require the transport of sulfur from the absorber vessel to other processing vessels for further treatment and/or separation.

SUMMARY OF THE INVENTION

Accordingly, it is an object of this invention to provide a process for removal of hydrogen sulfide from a gas stream which reduces the transport of sulfur between several processing vessels as is common in conventional processes.

It is another object of this invention to provide a process for removal of hydrogen sulfide from a gas stream using a redox couple for oxidation of the hydrogen sulfide to produce sulfur which reduces the loss of redox agent compared to conventional processes due to carry out with the sulfur product, thereby resulting in more flexibility in the choice of redox agents, including the possibility of using more expensive and more stable redox agents.

It is yet another object of this invention to provide a process for removal of hydrogen sulfide from a gas stream which avoids the problem of plugging of the absorption vessel with sulfur as is common in conventional processes.

These and other objects of this invention are achieved by a process for removal of hydrogen sulfide from a hydrogen sulfide-containing gaseous stream comprising contacting the hydrogen sulfide-containing gaseous stream with a nonaqueous phase sorbent under conditions suitable for forming a hydrogen sulfide-laden sorbent and a clean gaseous stream. The hydrogen sulfide-laden sorbent is then mixed with an aqueous phase redox couple under conditions suitable for forming a mixture comprising sulfur, a regenerated nonaqueous phase sorbent, and a reduced aqueous phase redox couple. The sulfur thus produced is separated from the mixture; the reduced aqueous phase redox couple is extracted from the mixture; and the extracted reduced aqueous phase redox couple is contacted with an oxidizing agent under conditions suitable for regenerating the oxidized aqueous phase redox couple.

Thereafter, in accordance with one embodiment of the process of this invention, the regenerated nonaqueous phase sorbent is recirculated to contact an additional portion of the hydrogen sulfide-containing gaseous stream and the regenerated oxidized aqueous phase redox couple is recirculated to mix with an additional portion of hydrogen sulfide-laden sorbent formed by the contact of the regenerated nonaqueous phase sorbent with the hydrogen sulfide-containing gaseous stream.

A system for removal of hydrogen sulfide from a gas stream in accordance with one embodiment of this invention comprises contact means for contacting the gas stream with a nonaqueous phase sorbent, forming a hydrogen sulfide-laden sorbent, mixing means for mixing the hydrogen sulfide-laden sorbent with an oxidized aqueous phase redox couple, forming a mixture comprising sulfur, a regenerated nonaqueous phase sorbent and a reduced aqueous phase redox couple, separation means for separating the sulfur, the regenerated nonaqueous phase sorbent and the reduced aqueous phase redox couple, regeneration means for regenerating the oxidized aqueous phase redox couple, forming a regenerated oxidized aqueous phase redox couple, and recycle means for recycling the regenerated oxidized aqueous phase redox couple to the mixing means and for recycling the regenerated nonaqueous phase sorbent to the contact means. In accordance with one embodiment of this invention, the contact means comprises an absorber and the regeneration means comprises an aerator.

BRIEF DESCRIPTION OF THE DRAWING

These and other objects and features of this invention will be better understood from the following detailed description taken in conjunction with the sole drawing which shows a system for removal of hydrogen sulfide from a gas stream in accordance with one embodiment of this invention.

DESCRIPTION OF PREFERRED EMBODIMENTS

Hydrogen sulfide ($H_2S$) contamination of a gas stream is a problem in many industries. In the natural gas industry, removal of $H_2S$ to meet the pipeline specification of 4 ppm is required. In other industries, hydrogen sulfide must be scrubbed to allow environmentally sound disposal or further use of process gas streams. There are increasing concerns over the cost and the environmental problems associated with treating future subquality gas reserves using traditional $H_2S$ removal processes. Much $H_2S$ is removed by processes based on amine scrubbing followed by a Claus unit for conversion of scrubbed $H_2S$ to sulfur. However, this arrangement requires expensive multi-stage processing. In addition, the Claus process is inflexible, expensive to apply below about 20 tons per day, and frequently requires a tail gas clean-up process to meet environmental regulations.

Liquid redox sulfur recovery processes provide more direct conversion of $H_2$ to sulfur. One major problem with conventional liquid redox sulfur recovery systems is the formation of a type of sulfur that is difficult to handle and remove from the system. The formation of this type of sulfur results in deposition and plugging of equipment by sulfur, foaming due to sulfur particles in gas/liquid contacting equipment, filtration problems, and production of a poor quality sulfur which is difficult to market. The unmanageable nature of this type of sulfur is apparently due to the very small particle size of sulfur formed in aqueous solutions, which in turn is due to the inherent low solubility of sulfur in water. Surfactant or surface active agents are often added to make the sulfur easier to remove and handle. Addition of these species, however, is difficult to control and leads to undesirable foaming. In addition, the use of surfactants constitutes an additional expense because they adhere to the sulfur and are removed from the system with the sulfur and, thus, must be replaced.

In contrast thereto, nonaqueous solvent-based systems produce large crystal size sulfur and, thus, much improved sulfur separability and handling. However, sulfur formation is hindered in many nonaqueous solvents due to formation of stable polysulfides which are only sluggishly converted to sulfur. In addition, air regeneration (oxidation) of reduced redox couples is often hindered in nonaqueous solvents.

The process of this invention is a double loop liquid—liquid process which combines the beneficial features of both aqueous and nonaqueous systems. It is a two-liquid phase system having both an aqueous phase component and a nonaqueous phase component, the nonaqueous phase scrubbing the $H_2S$ from the gas stream and the aqueous phase containing a redox agent which may or may not be soluble in the nonaqueous phase. Because the $H_2S$ is not immediately converted to sulfur, there is no sulfur formation in the absorber and, thus, no problems associated with plugging the absorber or other gas handling vessels with sulfur.

The nonaqueous fluid containing $H_2S$ from the absorber and an aqueous fluid containing the oxidized form of the redox couple are thoroughly mixed, thereby removing the sulfide from the nonaqueous phase by reaction with the redox couple in the aqueous phase and regenerating the nonaqueous solvent which can then be returned to the absorber. The aqueous phase is then separated and the redox couple is regenerated with air or by electrochemical means. The sulfur which is formed has large particle size, good color, and favorable handling characteristics. No surfactants are needed for sulfur conditioning in this process. As a result there is no surfactant control problem, foaming due to surfactant addition, or surfactant expenses.

One of the benefits of this process over conventional $H_2S$ removal processes is the fact that the sulfur does not have to be transported between many processing vessels as is common, and a source of operating problems, in conventional processes. In addition, this process offers more flexibility in the choice of redox agents because there is less loss of redox agent due to carry-out with the sulfur. Thus, more expensive redox agents which are more chemically stable, thereby reducing the degradation problem associated with redox agents, can be economically employed.

The overall reaction for this process, which is the same as for conventional liquid redox and Claus processes, is as follows:

$$H_2S + \tfrac{1}{2}O_2 \rightarrow S + H_2O \qquad \text{(Eq. 1)}$$

Direct oxidation of $H_2S$ by oxygen is slow at ambient temperatures and, thus, requires either high temperatures and a solid catalyst or a reactive redox couple catalyst (Ox) as shown in the following reaction:

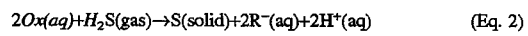

$$2Ox(aq) + H_2S(gas) \rightarrow S(solid) + 2R^-(aq) + 2H^+(aq) \qquad \text{(Eq. 2)}$$

The symbol $R^-$ is used for the reduced form of the oxidizing agent which is a one electron redox couple in the example shown in Equation 2. The oxidized form of the redox couple is regenerated with air in a separate vessel according to the following reaction:

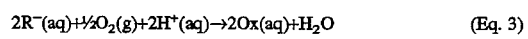

$$2R^-(aq) + \tfrac{1}{2}O_2(g) + 2H^+(aq) \rightarrow 2Ox(aq) + H_2O \qquad \text{(Eq. 3)}$$

This reaction consumes protons, neutralizing the protons generated in the sorption step.

Redox couples suitable for use in accordance with the process of this invention comprise all oxidants suitable for use in conventional liquid redox sulfur recovery processes. In accordance with a preferred embodiment of this invention, oxidants particularly suitable for use in the process of this invention are selected from the group consisting of chelated ferric ion, unchelated ferric ion in acid solution, complexed ferric ions, aqueous vanadium in the +5 oxidation state (V), iodine/triiodide, sulfur dioxide, 9, 10 anthraquinone and mixtures thereof. Iron-based redox couples are particularly preferred due to the inherently less toxic nature of iron compared to, for example, vanadium. In addition, the rate of oxidation of reduced iron chelates with $O_2$ is fast compared to older vanadium-based processes. In aqueous solution, the rate of air oxidation of $Fe^{2+}$ chelated with ethylenediamine-N,N,N,N',N'-tetraacetate (EDTA), for example, is several orders of magnitude greater than that of uncomplexed ferrous iron. Chelation of iron shifts the redox potential of FeEDTA about 0.6 V negative of that for simple uncomplexed ferric ion, producing a much higher driving force for oxidation. The iron chelates still react rapidly with $H_2S$ to produce sulfur. However, a major problem in the regeneration step for iron chelate-based processes is chemical degradation of the chelating agent. This requires a chemical makeup which adds to the expense of the process.

In accordance with one embodiment of the process of this invention, regeneration of the oxidized aqueous phase redox couple is carried out electrochemically. Because there is no sulfur present in the aqueous phase, as in conventional processes, there is no sulfur present to foul the electrochemical cell electrodes. The main advantage of electrochemical regeneration over direct aeration of the reduced solution is that the probability of degradation of the organic ligands associated with the redox couple is much reduced and the formation of sulfur oxyanions is also much reduced because the potential can be controlled to avoid these undesirable reactions and because there is no $O_2$ present. On the other hand, air regeneration has the advantage of simplicity and lower capital costs.

Nonaqueous solvents suitable for use in accordance with the process of this invention are substantially water-insoluble and support sorption of $H_2S$ or solvate reagents which absorb $H_2S$. In accordance with one preferred embodiment of this invention, nonaqueous solvents are selected from the group consisting of propylene carbonate (PC), benzonitrile, water-insoluble amines, and mixtures thereof. In accordance with a particularly preferred embodiment of this invention, propylene carbonate (PC) is a preferred solvent due to the relatively high solubility of $H_2S$ in propylene carbonate (PC). In addition, propylene carbonate (PC) is inexpensive, and has low volatility and high chemical stability.

In accordance with one embodiment of the process of this invention, water-insoluble amines suitable for use as non-aqueous solvents are selected from the group consisting of dibutylamine, N, N, dimethylaniline, 2-anilinoethanol, 2-(dibutylamino) ethanol, dibenzylamine, tributylamine, dicyclohexylamine, and mixtures thereof. In accordance with another preferred embodiment of this invention, water-insoluble amines or other $H_2S$—bonding agents, or aromatic nitriles may be added to propylene carbonate (PC) or other such solvent.

In accordance with another embodiment of the process of this invention, some redox couple catalyst is mixed with the nonaqueous phase to promote more efficient scrubbing of $H_2S$ than can be obtained with a physical solvent alone. In this case, the formation of polysulfides, rather than solid sulfur, in the nonaqueous phase is desirable. Contacting the polysulfide-containing nonaqueous phase with the proper aqueous phase solution containing an oxidizing agent will force the formation of solid sulfur and regeneration of the nonaqueous phase.

Because propylene carbonate (PC) is a "physical" solvent for $H_2S$, one of the issues relating to application of the process of this invention to high pressure gas streams is the transfer of the $H_2S$-laden solvent at high pressure to the reaction vessel for contacting with the aqueous redox stream. If the $H_2S$-laden solvent is reduced to near ambient pressure before contacting the oxidizing agent, flashing of $H_2S$, and dissolved hydrocarbons, may occur. Although the process can be designed to accommodate this, requiring, for example, compressors to recycle the flashed gases back to the high pressure system, a preferred solution is to contact the $H_2S$/propylene carbonate (PC) mixture with the aqueous redox stream at high pressure. Once the $H_2S$ is partially oxidized, no flashing of $H_2S$ will occur when the pressure is subsequently lowered.

In accordance with another embodiment of this invention, a solvent which chemically binds the $H_2S$ more strongly than a physical solvent, such as an amine solvent which undergoes an acid-base reaction with $H_2S$ is employed. The kinetics of $H_2S$ release from such solvents is sufficiently slow so that the bound $H_2S$ can be treated with the oxidant at low pressure with minimal flashing. Water insoluble amines or other $H_2S$—bonding agent, either alone or in combination with a physical solvent such as propylene carbonate (PC), may be used for this purpose. Other suitable solvents include aromatic nitriles which form bonds with $H_2S$ which do not allow its release on flashing, but which can be regenerated by oxidation of the bound sulfide to sulfur.

The temperature range for carrying out the process of this invention is variable between the melting point of the highest melting liquid phase and about 110° C. The preferred temperature range in which to carry out this process is between about 5° C. and about 50° C.

The concentration of oxidant in the aqueous liquid phase is preferably between about 0.001 gmole/L to the solubility limit of the aqueous liquid phase. In accordance with a preferred embodiment, the oxidant concentration is between about 0.01 and 1.0 gmole/L.

EXAMPLE I

A 50 mL aliquot of propylene carbonate (PC) was contacted with a 5% $H_2S$ gas mixture producing a solution containing 0.023M sulfide (by potentiometric titration with cadmium ion). The solution was shaken with 25 mL of a 0.1M solution of ferric (Fe(III)) HEDTA (HEDTA=N-(2-hydroxyethyl) ethylenediamine-N,N',N'- triacetate) in water in a separatory funnel. After about a one (1) minute reaction time, the propylene carbonate (PC) was analyzed and no sulfide was detected, indicating complete reaction. The ferrous iron (Fe(II)) concentration in the aqueous phase increased from 0.0 to 0.075M (as measured by a phenanthroline-based spectrophotometric method for Fe(II)) due to reaction of Fe(III) with the sulfide originally in the propylene carbonate (PC) phase. When the mixture was allowed to stand, the two liquids separated rapidly and sulfur began to form at or near the surface between the two liquid phases. The sulfur separated and settled down through the denser nonaqueous phase. The sulfur was yellow and had favorable properties of sulfur normally formed from non-aqueous rather than aqueous systems. The ferrous HEDTA redox couple in the aqueous phase was readily regenerated by aeration of the solution.

EXAMPLE II

Another experiment was conducted with continuous absorption of $H_2S$ in propylene carbonate (PC) and regeneration of the $H_2S$-laden propylene carbonate (PC) with an aqueous-based oxidizing agent under the following conditions:

Gas: 5% $H_2S$ in $N_2$, flow rate variable from 75–300 cc/min;

Scrubber: 7.0 inches of 5 mm raschig ring packing, 1.0 inch diameter contactor;

Propylene Carbonate: 8–20 cc/min, 250 mL inventory;

Oxidant: 0.2M FeHEDTA, 15 cc/min; 300 mL inventory, regenerated with air (350 cc/min); oxidizer volume: 150 mL.

A 500 mL pear-shaped multi-neck flask was used as the liquid-liquid separator/sulfur collector in this run. The run lasted approximately six (6) hours. Sulfur was observed forming at the propylene carbonate-aqueous interface in the separator. The sulfur readily fell to the bottom of the separator. Separation of the two liquid phases was rapid. About 80% removal of $H_2S$ on the short (7.0 inch) column was obtained when the column was flooded with propylene carbonate. Significantly better removal was observed under conditions when the propylene carbonate was siphoned off the column, leaving only the wetted raschig rings.

The sulfur thus produced was easily washed and dried. After allowing the sulfur to stand at room temperature overnight, no additional water was lost on drying at 110° C. The sulfur was yellow, unlike the gray color usually associated with "liquid redox" sulfur. The measured pH stayed between 7–7.5 in both the aqueous and propylene carbonate phases through the run. This is additional evidence that the nonaqueous sorbent is regenerated by contacting with the aqueous redox agent. The Fe(II)HEDTA was regenerated to more than 95% in the oxidizer. The stoichiometry of consumption of sulfide in the propylene carbonate matched the Fe(II) consumption to within 15%.

Based upon the fact that equilibrium saturation of the propylene carbonate occurred after about 33 minutes, and based further on the fact that the test was about 6.0 hours in duration, the nonaqueous solvent experienced eleven (11) "turnovers" with no apparent degradation in its ability to remove $H_2S$. This illustrates the ability of the aqueous redox solution to regenerate the nonaqueous, $H_2S$-laden solvent. A red colored characteristic of "Fe—S—Fe" compounds was observed at the top of the scrubber packing when operating under liquid starved conditions. This is evidence that the iron chelate, which is present in a low concentration in the propylene carbonate, can react with $H_2S$ in the absorber to provide additional sorption. No sulfur formation was observed in the scrubber.

EXAMPLE III

In this example, propylene carbonate and 0.17M aqueous FeEDTA at pH 7.8 were employed in the process which was operated continuously for 100 hours on gas containing 16.8% $H_2S$, with the balance being nitrogen. Test conditions were as follows:

| Sour Gas: | |
|---|---|
| Flow (scc/min) | 114 |
| $H_2S$ concentration (%) | 16.8 |
| $N_2$ concentration (%) | 83.2 |
| Pressure | Atmospheric |
| Temperature (°C.) | Ambient (20 to 23.5° C.) |
| Propylene Carbonate (PC): | |
| Flow (ml/min) | 23 |
| Loading (mg HS$^-$/L) | 1100 |
| Temperature (°C.) | Ambient (20 to 23.5° C.) |
| Inventory (ml) | 630 |
| Fe/EDTA Solution: | |
| Flow (ml/min) | 26 |
| Fe Concentration (mM/wt %) | 174/0.87 |
| EDTA Concentration (mM) | 166 |
| Temperature (°C.) | Ambient (20 to 23.5° C.) |
| Inventory (ml) | 1000 |
| Air To Series Oxidizers: | |
| Oxidizer #1 Flow (scc/min) | 200 |
| Oxidizer #2 Flow (scc/min) | 1000 |

A 24-inch tall, 1.0-inch diameter scrubber filled with 5 mm raschig rings was used to scrub the $H_2S$. $H_2S$-rich propylene carbonate from the scrubber flowed into a reaction flask along with aqueous FeEDTA from the aerators. The reaction flask consisted of a 500 mL pear-shaped flask fitted with a magnetic stirrer for mixing. The mixture from this vessel flowed into the vessel used for separation of the two liquid phases and the sulfur. This vessel has a volume of 750 mL and a V-shaped bottom. It consists of a 1.0-inch wide polyethylene section sandwiched between two plate glass sides with O-ring seals. The emulsion from the reaction tank enters at one end of the vessel and passes through four baffles. The upper and lower liquid layers are drawn off at the other end. During the run, the majority (92%) of the sulfur collected in the bottom of this vessel. Sulfur was removed from the settling vessel batchwise approximately every 4 to 6 hours. A peristaltic pump was used to suck the elemental sulfur particles from the bottom of the settlor and pump them through a filter. Propylene carbonate from the filter was returned to the mixing vessel. In this implementation of the process, in-line filters were used in the non-aqueous line between the liquid-liquid separator sulfur separator and the absorber column to collect sulfur fines. Such an in-line filter should not be required on larger scale units because better settling in full size units will be possible.

During this run, an average of 99.0% $H_2S$ removal from a gas stream of 114 scc/min that contained an average of 16.8% $H_2S$ was achieved. The process converted the majority of $H_2S$ absorbed into elemental sulfur. About 1.2% of the $H_2S$ was converted into sulfur oxyanion salts. Excellent agreement was obtained between the weight of $H_2S$ delivered from the $H_2S$ storage tank and the sum of the sulfur and total sulfate produced. During the 100 hours of operation, the aqueous phase passed through approximately 154 residence times and the nonaqueous phase passed through approximately 218 residence times, proving that the process is stable under extended operation. The removal of $H_2S$ at the end of the run was essentially the same as or better than it was at the beginning of the run.

EXAMPLE IV

Scanning electron microscopic analysis of the sulfur produced under conditions of Example III showed that the primary particle size was an order of magnitude larger than that produced by typical aqueous-based liquid redox sulfur recovery processes. Typical sulfur primary particles formed in the double loop process of this invention were slightly oval in shape with the dimension typically being 17–25 microns as measured at 1000 X magnification. The dimensions of typical sulfur primary particles formed by aqueous liquid redox processes were 1 to 3.5 microns when measured in the same manner.

EXAMPLE V

A run under essentially the same conditions and equipment as set forth in Example III was conducted using carbon dioxide ($CO_2$) instead of nitrogen. The inlet gas composition was 17% $H_2S$ with the balance being $CO_2$. The $CO_2$ had practically no effect on the removal of $H_2S$ or the operability of the process. Stable conditions were maintained for 8.2 hours during which time the aqueous phase passed through approximately 13 residence times and the nonaqueous phase passed through approximately 18 residence times. Average removal of $H_2S$ during this period was 99.4%. Examination of product sulfur using a scanning electron microscope showed essentially the same morphology and large particle size as the sulfur produced in the absence of $CO_2$.

EXAMPLE VI

A batch run was conducted using $SO_2$ (added as sulfite) as the aqueous phase oxidant, thereby demonstrating that a rapid, room temperature "liquid Claus" process is possible using the process of this invention. A solution of 0.44M $H_2S$ was prepared in propylene carbonate by absorption of pure $H_2S$. 25 mL of this solution was shaken for one minute with 6 ml of a solution of 1.0M sodium sulfite in citrate-buffered solution at a pH of 4.76. Two liquid phases and a solid settled immediately after shaking was stopped. The sulfur thus formed was yellow and settled readily to the bottom of the propylene carbonate phase. In contrast to the process of this invention, other known single liquid-phase Claus processes either require elevated temperature and catalyst to achieve comparable rapid conversion rates or produce very fine "white" sulfur which is difficult to handle.

EXAMPLE VII

In this example, a run was conducted under essentially the same conditions and equipment as set forth in Example III except that sodium thiocyanate was added to a concentration of 0.75M in the aqueous phase and 0.25M in the propylene carbonate phase. Thiocyanate is known to be a scavenger for hydroxyl radicals which are thought to be a cause of chelate degradation. The process was run for a total of 18 hours with no EDTA addition to the system. There was no apparent change in the system's ability to remove $H_2S$ or to regenerate Fe(III)EDTA by oxidizing the Fe(II)EDTA. The thiocyanate significantly reduced the EDTA degradation rate to 0.08 mM/hr compared to 3.3 mM/hr without thiocyanate.

EXAMPLE VIII

In this example, a run was conducted under essentially the same conditions and equipment as set forth in Example III except that sodium thiosulfate was added to a concentration of 0.5M in the aqueous phase. This salt is sparingly soluble in the propylene carbonate phase. Thiosulfate is known to be a scavenger for hydroxyl radicals which are thought to be a cause of chelate degradation. The process was run for a total of 18 hours with no EDTA addition to the system. There was no apparent change in the system's ability to remove $H_2S$ but the efficiency of regeneration of Fe(III)EDTA was somewhat reduced. The thiosulfate significantly reduced the EDTA degradation rate to 0.29 mM/hr compared to 3.3 mM/hr without thiosulfate.

EXAMPLE IX

In this example, a run was conducted under essentially the same conditions and equipment as set forth in Example III except that 2-(dibutylamino)ethanol (DBAE) was added to the propylene carbonate at a concentration of 0.1M. The amine/PC mixture was saturated with water before starting the run. DBAE is only sparingly soluble in water. Addition of the DBAE lowered the outlet $H_2S$ concentration by a factor of about 100 as compared to water-saturated propylene carbonate alone. This substantial increase in $H_2S$ removal efficiency was maintained throughout the 8 hour run. During this time, about 3.6 times more moles of $H_2S$ were added than amine initially present, and sulfur was formed. These results indicate that the $H_2S$ was chemically bound to the amine but that the amine was regenerated by contacting with the aqueous solution containing Fe(III) EDTA.

A system for removal of hydrogen sulfide from a gas stream in accordance with one embodiment of this invention is shown in the drawing. Sour gas comprising $H_2S$ is introduced into absorber 10 containing a nonaqueous phase sorbent. The nonaqueous phase sorbent scrubs the $H_2S$ from the gas stream. The $H_2S$-laden nonaqueous phase sorbent is transferred into reactor vessel 11 in which it is mixed by mixer 12 with the oxidized form of a redox couple in an aqueous fluid, resulting in removal of the sulfide from the nonaqueous phase by reaction with the redox couple in the aqueous phase and regenerating the nonaqueous phase sorbent which can then be returned to absorber 10. The aqueous phase and nonaqueous phase sorbent are separated in separator 14 in which sulfur in the aqueous phase settles to the bottom and is removed therefrom. The reduced form of the redox couple, having been separated from the regenerated nonaqueous phase sorbent, is transferred into regenerator 13, in the form of an aerator, through which air is flowing, resulting in regeneration of the oxidized form of the aqueous redox catalyst which, in turn, can be recycled to reactor 11.

In accordance with one embodiment of the system of this invention, regenerator 13 comprises an electrochemical cell having two compartments. The reduced aqueous catalyst stream from separator 14 flows into the anode compartment of the electrochemical cell where it is oxidized to an active oxidized form on the anode. Simultaneously, hydrogen cations from dissociated $H_2S$ are transferred from the anode compartment to the cathode compartment through a cation selective membrane which separates the two compartments. In the cathode compartment, the hydrogen ions are either reduced to hydrogen on the cathode, or they are combined with hydroxide ions generated from the reduction of oxygen, by air, to form water. Sodium ions (or other cations) may be transported in place of the hydrogen ions and the alkali formed in the cathode compartment added back to the anode stream as makeup. The embodiment using an air electrode is preferable because it reduces the electrical energy needed to drive the regeneration. In this case, the regenerator is operating as a "fuel cell".

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for removal of hydrogen sulfide from a hydrogen sulfide-containing gaseous stream comprising:

contacting said hydrogen sulfide-containing gaseous stream with a nonaqueous phase sorbent comprising at least one substantially water-insoluble organic solvent under conditions suitable for forming a hydrogen sulfide-laden sorbent and a clean gaseous stream, thereby forming said hydrogen sulfide-laden sorbent and a clean gaseous stream;

mixing said hydrogen sulfide-laden sorbent with an oxidized aqueous phase redox couple under conditions suitable for forming a mixture comprising sulfur, a regenerated said nonaqueous phase sorbent, and a reduced aqueous phase redox couple, thereby forming said mixture;

separating said sulfur from said mixture; and extracting said reduced aqueous phase redox couple from said mixture and regenerating said oxidized aqueous phase redox couple.

2. A process in accordance with claim 1, wherein said regenerated said nonaqueous phase sorbent is recirculated to contact said hydrogen sulfide-containing gaseous stream and said regenerated oxidized aqueous phase redox couple is recirculated to mix with said hydrogen sulfide-laden sorbent.

3. A process in accordance with claim 1, wherein said nonaqueous phase sorbent further comprises a redox couple.

4. A process in accordance with claim 1, wherein said oxidized aqueous phase redox couple is selected from the group consisting of chelated ferric ion, unchelated ferric ion in an acid solution, complexed ferric ions, aqueous vanadium in the 5 oxidation state (V), iodine/triiodide, sulfur dioxide, 9, 10 anthraquinone and mixtures thereof.

5. A process in accordance with claim 4, wherein said oxidized aqueous phase redox couple is ferric EDTA.

6. A process in accordance with claim 1, wherein said substantially water-insoluble organic solvent is selected from the group consisting of propylene carbonate, benzonitrile, water-insoluble amines and mixtures thereof.

7. A process in accordance with claim 1, wherein said oxidized aqueous phase redox couple is regenerated by aeration of said reduced aqueous phase redox couple.

8. A process in accordance with claim 1, wherein said oxidized aqueous phase redox couple is regenerated electrochemically.

9. A process for removal of hydrogen sulfide from a hydrogen sulfide-containing gaseous stream comprising the steps of:
absorbing said hydrogen sulfide in said hydrogen sulfide-containing gaseous stream with a nonaqueous phase sorbent comprising at least one substantially water-insoluble organic solvent thereby forming a hydrogen sulfide-laden sorbent;
mixing said hydrogen sulfide-laden sorbent with an oxidized aqueous phase redox couple thereby forming a mixture comprising sulfur, a regenerated said nonaqueous phase sorbent, and a reduced aqueous phase regenerant;
separating said sulfur from said mixture; and
extracting said reduced aqueous phase regenerant from said mixture and oxidizing said reduced aqueous phase regenerant thereby regenerating said oxidized aqueous phase redox couple.

10. A process in accordance with claim 9, wherein said regenerated oxidized aqueous phase redox couple is recirculated to said absorption step and said regenerated nonaqueous phase sorbent is recirculated to said mixing step.

11. A process in accordance with claim 9, wherein said nonaqueous phase sorbent further comprises a redox couple.

12. A process in accordance with claim 9, wherein said oxidized aqueous phase redox couple is selected from the group consisting of chelated ferric ion, unchelated ferric ion in an acid solution, complexed ferric ions, aqueous vanadium in the 5 oxidation state (V), iodine/triiodide, sulfur dioxide, 9, 10 anthraquinone and mixtures thereof.

13. A process in accordance with claim 12, wherein said oxidized aqueous phase redox couple is ferric EDTA.

14. A process in accordance with claim 9, wherein said substantially water-insoluble organic solvent is selected from the group consisting of propylene carbonate benzonitrile, water-insoluble amines and mixtures thereof.

15. A process in accordance with claim 9, wherein said reduced aqueous phase redox regenerant is oxidized by aeration.

* * * * *